US005533329A

United States Patent [19]

Ohyama et al.

[11] Patent Number: 5,533,329

[45] Date of Patent: Jul. 9, 1996

[54] CONTROL APPARATUS FOR AND CONTROL METHOD OF GAS TURBINE

[75] Inventors: Yoshishige Ohyama; Yutaka Nishimura, both of Katsuta; Yoshio Sato, Hitachi; Motohisa Nishihara, Katsuta; Shigeru Azuhata, Hitachi; Kazuyuki Ito, Katsuta, all of Japan

[73] Assignee: Hitachi, Ltd., Tokyo, Japan

[21] Appl. No.: 240,363

[22] Filed: May 10, 1994

[30] Foreign Application Priority Data

May 17, 1993 [JP] Japan .................................... 5-114959

[51] Int. Cl.[6] .................................. F02C 9/16; F02C 9/50

[52] U.S. Cl. .......................................... 60/39.03; 60/39.27

[58] Field of Search ................................ 60/39.03, 39.27, 60/39.281, 39.29

[56] References Cited

U.S. PATENT DOCUMENTS 5,327,718 7/1994 Iwata et al. ............................ 60/39.27
5,349,812 9/1994 Taniguchi et al. ..................... 60/39.27

FOREIGN PATENT DOCUMENTS 142410 11/1979 Japan .
33410 2/1990 Japan .
163423 6/1990 Japan .
186020 7/1992 Japan .

*Primary Examiner*—Louis J. Casaregola
*Attorney, Agent, or Firm*—Antonelli, Terry, Stout & Kraus

[57] ABSTRACT

A control apparatus for a gas turbine having an air flow control valve for controlling the flow rate of combustion air in an air flow passage from a compressor to the gas turbine, includes an air velocity or flow sensor arranged in the vicinity of the air flow control valve. A control unit operates to control the opening of a fuel flow regulation valve and/or an air flow control valve on the basis of a signal from the air velocity or flow sensor, thereby to control the air fuel ratio in a combustion section of the gas turbine.

13 Claims, 10 Drawing Sheets

CONTROL APPARATUS FOR AND CONTROL METHOD OF GAS TURBINE

BACKGROUND OF THE INVENTION

The present invention relates to a control apparatus and method for operating a gas turbine, and, more particularly, to a control apparatus and a control method for a gas turbine of the type in which a control valve for controlling the combustion air flow rate is disposed in an air flow passage which supplies in from a compressor to the gas turbine, which control apparatus and method can control the air fuel ratio so that the emission of nitrogen oxides will be reduced.

It is important for a gas turbine combustor to reduce the emission of nitrogen oxides therefrom; therefore, it is important to control the air fuel ratio in the combustion section to of the gas turbine a suitable value. Many proposals concerning air fuel ratio control of gas turbine combustors have been provided and realized. An example of them is disclosed in JP A 4-186020, wherein a gas turbine combustor is provided with a changing mechanism for adjusting the opening area of an air intake port. The chemical emission spectrum of the flame in the main combustion zone is detected and the changing mechanism is controlled in closed loop on the basis of the detection result so that the air excess ratio (air fuel ratio) will be maintained at a value to be taken for a target value, in order to reduce the occurrence of nitrogen oxides and prevent the flames from being blown out.

Further, another method is disclosed in JP A 2-163423, in which the amount of air passing through a combustor is calculated from the compressor output pressure, the turbine inlet pressure, the turbine inlet temperature, the turbine outlet pressure, etc. and the air fuel ratio and fuel amount are controlled.

Further another method is disclosed in JP A 54-142410, in which each air flow rate in separated air flows into a high temperature section and a cold section of a step-up apparatus in a turbo fun engine is calculated by using measured engine parameters and known parameters, and a schedule control of a high temperature section fuel air ratio and a cold section fuel air ratio is effected, based on the calculated values.

In a conventional air fuel ratio control, calculation of an air amount is carried out, based on the following technical knowledge:

1) The air amount is proportional to the rotating speed of the turbine;
2) The air fuel ratio is a function of air pressure and the electric generator output;
3) The air flow amount is represented by a difference between a compressor intake air amount and an extraction air amount;
4) The air amount is the function of the compressor output pressure, the turbine inlet pressure and the temperature.

Further, calculation of a turbine inlet temperature, which is one of the main parameters of the combustion conditions is carried out on the basis of the following premises:

5) The turbine inlet temperature is a function of the air fuel ratio and the turbine rotating speed;
6) The turbine inlet temperature is a function of the air amount and the exhaust gas temperature; and
7) The turbine inlet temperature is the function of a stationary blade temperature and the change ratio of the temperature.

In general, in closed loop control of the air fuel ratio, the response is slow when the turbine load is changed, since a change in the air amount will not follow a change in an fuel amount, and as a result, the air fuel ratio changes, so that emission of nitrogen oxides increases, or misfire and after burn take place.

Further, if a calculation based only on the above items 1) to 4) is employed, an air amount to be supplied to the combustion zone of the combustor can not be correctly estimated. Namely, these value are not measured values of an air amount to be supplied actually to the combustion section, but are values calculated using an air amount, pressure and temperature at the compressor section or turbine section as parameters. In the actual combustion, there exists an amount of bypass air bypassing the combustion zone without being subjected to combustion and an amount of cooling air, and a change in these air amounts changes the amount of combustion air supplied to the combustion zone. Therefore, it is difficult to estimate correctly the amount of air to be supplied to the combustion zone by the above-mentioned calculation. Accordingly, usually, the air fuel ratio is set to a little smaller value in view of the calculation error in the air amount, resulting in insufficient reduction in the emission of nitrogen oxides.

Further, if only the above calculation of an air amount is employed it is difficult to obtain an air amount for each combustor in a gas turbine provided with a plurality of combustors and to obtain air amounts in local places of each combustor. Therefore, it is difficult to solve an imbalance in air fuel ratio due to a difference in air amount between the combustors and a difference in air amounts in the local places of each combustor. In this case also, the air fuel ratio is set to a smaller value in view of the above-mentioned differences in fuel amount, so that the reduction in the emission of nitrogen oxides is insufficient.

The reduction in the emission of nitrogen oxides is more remarkable in the case in which a calculation result of turbine inlet temperature as shown in the above items 5) to 7) is used for calculation of an air amount.

As disclosed in JP A 54-142410, in the method in which each of the flow rates in the divided flows into the high temperature section and the cold section of the step-up apparatus is obtained by calculation, and a scheduled control of the high temperature section fuel air ratio and the cold section fuel air ratio is effected, based on the calculated flow rates, the desired air amounts in local places of the combustor can be obtained and each air amount can be controlled locally. Therefore, the method may suggest a method of eliminating any imbalance in the air fuel ratios among local places of the combustor. In this case also, however, an air amount is calculated by using measured engine parameters and known parameters, so that the disadvantage that the obtained air amount is not necessarily coincident with an air amount really supplied can not be avoided.

Further, in the case where an air amount is calculated the air fuel ratio is controlled on the basis of the calculation result, in order to effect a correct control without any delay, it is necessary to establish a system environment which is easy to model. It may be relatively easy for a turbo fan engine of the type which is disclosed in JP A 54-142410. However, as disclosed in JP A 4-186020 or in JP A 2-33419, for example, in a gas turbine of the type in which an air flow control valve for controlling a flow rate of combustion air is disposed in an air flow passage which supplies from a compressor to a gas turbine, air distribution patterns may occur which are not easy to anticipate or are difficult to model, so that precise air amount calculation is impossible and the construction of a satisfactory control system is very difficult.

SUMMARY OF THE INVENTION

An object of the invention is to provide a control apparatus method for control of a gas turbine, which control apparatus and method do not cause an increase in occurrence of nitrogen oxides due to incomplete air fuel control in a gas turbine, as in the above-mentioned conventional control. More particularly, a first object of the invention is to set the air fuel ratio to a larger value and to reduce the emission of nitrogen oxides without causing misfire, after burning by detecting in a direct and highly precise manner a combustion air amount for a combustor in a gas turbine having an air flow control valve for controlling the flow rate of combustion air in an air flow passage from a compressor to the gas turbine.

A second object of the invention is to solve problems of differences in air amounts and air fuel ratios at local places of each combustor by highly precisely detecting combustion air velocity or air flow rates at a plurality of places in the combustor, thereby to reduce an emission amount of nitrogen oxides.

A third object of the invention is to prevent an imbalance between air fuel ratios in respective combustors by highly precisely detecting air flow velocity or flow rate in each of the combustors, thereby to set the overall air fuel ratio to a larger value and to reduce the amount of emission of nitrogen oxides.

The invention for carrying out the first object resides in a control apparatus for a gas turbine having an air flow control valve for controlling the flow rate of combustion air in an air flow passage from a compressor to the gas turbine, characterized in that the control apparatus comprises an air velocity or flow sensor arranged in the vicinity of the air flow control valve, and control means for controlling an opening of a fuel flow regulation valve and/or an air flow control valve on the basis of a signal from the air velocity or flow sensor, thereby to control the air fuel ratio in a combustion section; and a control method for a gas turbine having an air flow control valve for controlling the flow rate of combustion air in an air flow passage from a compressor to the gas turbine, characterized by the step of obtaining a measured value signal representing velocity or flow rate of combustion air in the vicinity of the air flow control valve, and regulating an opening of a fuel flow regulation valve and/or air flow control valve on the basis of the measured value signal, thereby to control the air fuel ratio in the combustion section.

In a preferable aspect of the invention, a hot wire air flow sensor is arranged in the vicinity of an air flow control valve for controlling an air flow rate in an air flow passage of a combustor, thereby to measure the combustion air amount directly. At least one of the fuel flow regulation valve and the air flow control valve is controlled by the output of a control means on the basis of the detected signal, thereby to control the air fuel ratio precisely, whereby an air fuel ratio according to the load is optimized, that is, to control the air fuel ratio to a minimum value very close to the level in which misfire occurs, whereby the emission of nitrogen oxides is minimized.

In a preferable aspect of the invention to carry out the second object, air flow sensors are arranged in each of a plurality of places in the combustor, and the amount of combustion air in each of the various places is directly detected. A plurality of fuel flow regulation valves an air flow distribution valve are controlled simultaneously by the output of a control unit on the basis of the measured signal. By this construction, the air fuel ratio in each local place is optimized, and the emission of nitrogen oxides is minimized.

In a preferable aspect of the invention to carry out the third object, an air sensor is arranged in each of the plurality of combustors, and a combustion air amount of each combustor is measured directly. On the basis of this measured signal, a fuel flow regulation valve and/or an air flow control valve of each combustor are controlled simultaneously by the output of the control unit, whereby any difference in the air fuel ratio among the combustors is made small or substantially zero and the emission of nitrogen oxides is minimized.

In the present invention, an air flow sensor preferably outputs a measured value in the form of electric signals according to the measured air velocity in each local place to supply these measured valued to the control unit. The control unit includes a microprocessor which calculates the velocity in each local place on the basis of measured values of the air velocity. Next, an air amount is obtained by multiplying it by a value representing the cross sectional area of the air passage, which value is stored in the microprocessor in advance. Next, a difference is calculated between the air amount and a set air amount which is stored in the microprocessor in advance, and then the control unit outputs an operational signal to an air flow distribution valve so that the difference is reduced to zero.

At the same time, a fuel flow sensor, which is arranged upstream of a fuel flow regulation valve, outputs an electric signal corresponding, and this signal is a fuel amount to input into the control unit. A difference between the fuel amount and a set fuel amount, which is stored in the microprocessor in advance, is calculated, and then the control unit outputs a operational signal to the fuel flow regulation valve. The fuel flow regulation valve is operated by each operational signal to regulate the fuel so that an air fuel ratio is maintained at a set value. The air amount and the fuel amount are controlled in a closed loop manner.

The control unit inputs signals, based on values measured by the air flow sensor. The control unit has set values of fuel amount started in advance, and outputs operational signals to the fuel flow regulation valve on the basis of the set values. In response to any change in the air amount, the fuel amount changes promptly, so that a fuel air ratio can be kept constant.

Further, a load demand signal is inputted into the control unit, initially. The control unit outputs an operational signal to the fuel flow regulation valve on the basis of a value of fuel to load stored in the microprocessor in advance. Also, a required air amount is calculated on the basis of a set value of air fuel ratio to load, and an operational signal is outputted to the air flow distribution valve. At this time, the operational signal is corrected on the basis of the output signal of the air flow sensor, and the air fuel ratio is kept to a set value.

In the manner as mentioned above, an air amount, a fuel amount and an air fuel ratio in the combustor of the gas turbine, which has an air flow control valve for controlling a flow rate of combustion air in an air flow passage from a compressor to the gas turbine, can be kept optimum over a wide operational range.

In general, the difference in air fuel ratio between local places of a combustor can be as a difference in the output signal of a temperature sensor. Accordingly, the required number of air flow sensors can be reduced by employing a plurality of temperature sensors for this purpose. The difference in air flow amounts in local places can be detected by output signals of the temperature sensors,and the operational signal of the air flow valve, based on signal of the air flow sensor, is corrected so that the difference becomes zero. The air flow valve is operated on the basis of this correction value. Further, the temperature, in general, is slow to change therefore, it is difficult to control air fuel ratio in a transitional time using a temperature sensor. Accordingly, the difference in air fuel ratio between local places in during a transitional usual operation time is corrected, then, a control of air flow amount is effected on the basis of the corrected operational signal, whereby a lowering of the responsiveness can be avoided. Sensors for combustion conditions, such as concentration, pressure, etc. can be used instead of the temperature sensor. Or it is possible to correct by flame spectrum date, etc.

BRIEF DESCRIPTION OF THE DRAWINGS

FIG. 8(*b*) is a control characteristic diagram;

DESCRIPTION OF THE EMBODIMENTS OF THE INVENTION

An embodiment of the invention is described hereunder referring to FIGS. 1 to 7.

Figure 1:
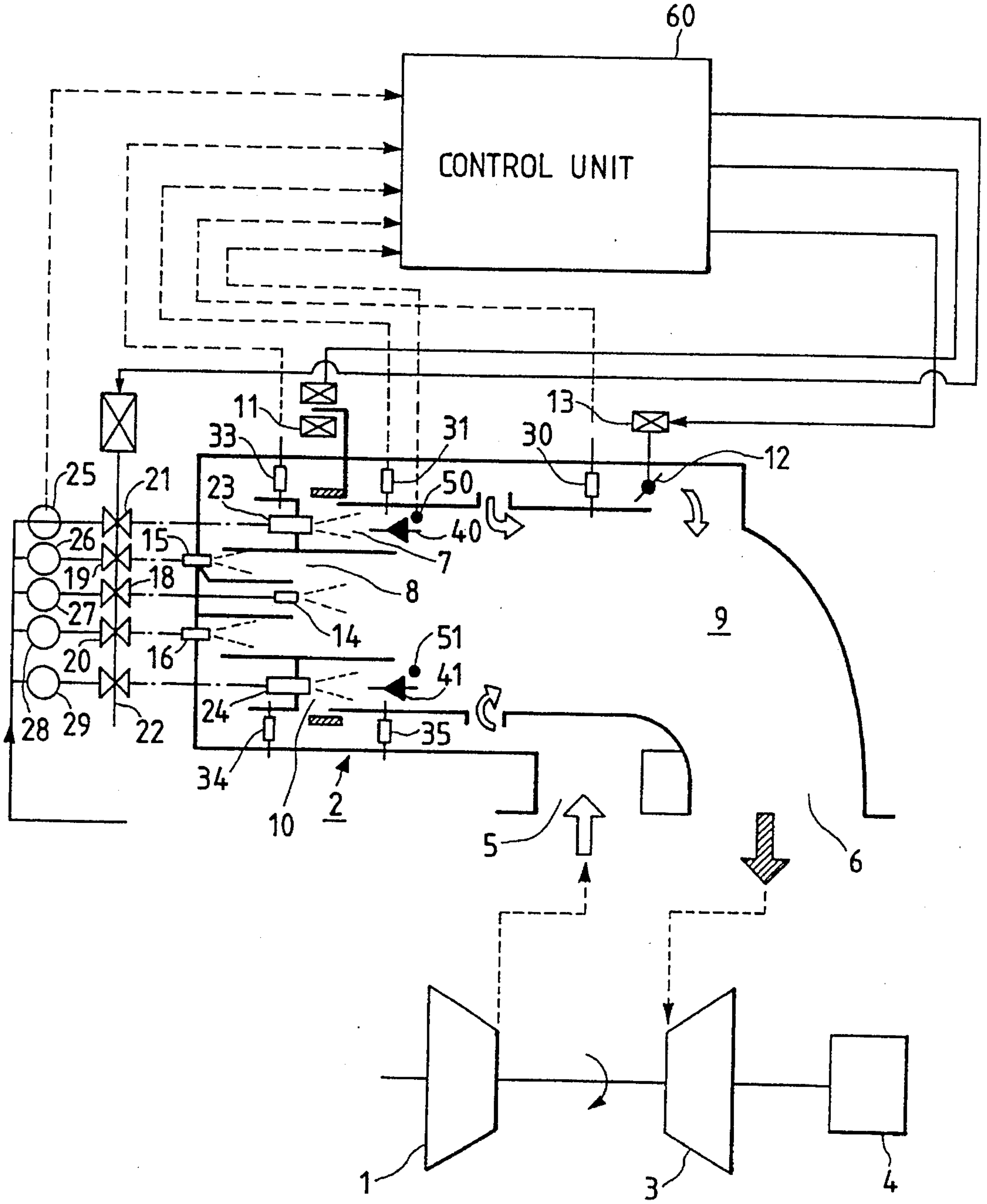
FIG. 1 is a schematic diagram of a gas turbine representing an embodiment of the invention.

In FIG. 1, an embodiment of a gas turbine employing a control apparatus according to the invention comprises a compressor 1, a combustor 2, a turbine 3 and an electric generator 4. An air intake port 5 of the combustor 2 is connected to an outlet of the compressor 1, and a combustion gas outlet 6 is connected to an inlet of the turbine.

The combustor 2 comprises a premixing section 7, a diffusion section 8 and a downstream section 9. An amount of air supplied to the premixing section 7 is regulated by a premixing air flow valve 10 which executes a function of an air flow control valve for controlling a flow rate of combustion air. The premixing air flow valve 10 is driven by a suitable actuator 11. In the downstream section 9, an air flow bypass is provided and a part of the compressed air bypasses through the air flow bypass in which a bypass air flow valve 12 is provided, which performs the function of an air flow control valve. The bypass air flow valve also is driven by a suitable actuator 13.

In the diffusion section 8, an ignition fuel nozzle 14 and diffusion fuel nozzles 15, 16 are arranged, and the amount of fuel supplied to the nozzles 14, 15, 16 is controlled by fuel flow regulating valves 18, 19 and 20. In the premixing section 7, premixing nozzles 23, 24 are arranged, and the amount of fuel thereto is controlled by fuel flow regulating valves 21, 22. Fuel flow sensors 25, 26, 27, 28, 29 are arranged at the upstream sides of the respective fuel flow regulating valves. Further, an air flow sensor 30 is disposed closely to and at the upstream side of the bypass air flow valve 12 in the air flow bypass. Air flow sensors 31, 35 and 33, 34 are arranged at the upstream side and at the downstream side of the premixing air flow valve 10, respectively. Those sensors are of the hot wire sensor type, for example, as will be described later.

The air flow sensor 30 detects the amount of air passing through the bypass air flow valve 12. The air flow sensors 31, 35 detect the amount of air supplied to the premixing section 7 and the diffusion section 8. Further, the air flow sensors 33, 34 detect the amount of air supplied to the diffusion section 8. The air amount supplied to the premixing section 7 is calculated by subtracting the measured values of the air flow sensors 33, 34 from the measured values of the air flow sensors 31, 35.

Stabilizers (flame stabilizing members) 40, 41 and temperature sensors 50, 51 are mounted on a portion of the premixing section 7. The temperature sensors 50, 51 each are made of Pt resistance wire, for instance. As the temperature of gas changes, the temperature of the resistance wire also changes accordingly, so that the electric resistance of the wire changes. A control unit 60, which includes a microprocessor, inputs signals from the respective fuel flow sensors 25, 26, 27, 28, 29, the respective air flow sensors 30, 31, 33, 34, 35 and the respective temperature sensors 50, 51, and outputs operational signals of the respective fuel flow regulating valves 21, 19, 18, 20, 22, the premixing air flow valve 10, and the bypass flow valve 12 on the basis of the input signals.

Figure 2:
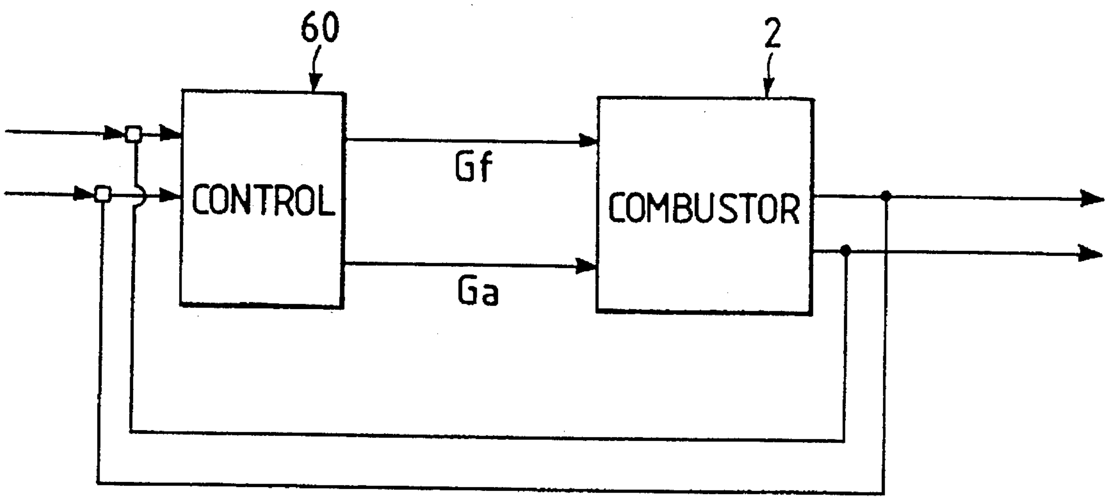
FIG. 2 is a block diagram of a control arrangement.

Next, the operation of the embodiment in FIG. 1 will be explained. The microprocessor of the control unit 60 has the output target value Po set in advance, and controls an fuel amount Gf for turbine output to become equal to the output target value Po, as shown in FIG. 2. In this case, the temperature in the combustor 2 is detected by the temperature sensors 50, 51. Next, a closed loop control is effected so that the air fuel ratio will be a set air fuel ratio. The air amount Ga is detected by the air flow sensors 30, 31, 33, 34, 35, and the premixing air flow valve 10 and the bypass air flow valve 12 are regulated so that the signals from the air flow sensors will be a set value. The fuel amount is detected by the fuel flow sensors 25 to 29, and the fuel flow regulation valves 21, 19, 18, 20, 22 are regulated so that the fuel amount will be a set value. The respective fuel flow regulating valves and the premixing air flow valve are controlled independently from each other, whereby the air amount, the fuel amount and the air fuel ratio in the premixing section 7 and the diffusion section 8 of the combustor 2 each are controlled to an optimum level over a wide range of operation.

For example, in FIG. 1, as the opening of the premixing air flow valve 10 increases, the amount of air distributed into the premixing section 7 increases; therefore, unless the amount of fuel from the fuel nozzles 23, 24 increases, the air fuel ratio will become too large a misfire may occur. In order to be free from this phenomenon, the control unit 60 detects a change in the amount of air supplied to the premixing section 7 on the basis of the signals from the air flow sensors 31, 35, and actuates the fuel flow regulating valves 21, 22 according to the detected change, whereby a transitional variation of the air fuel ratio can be avoided.

Figure 3:
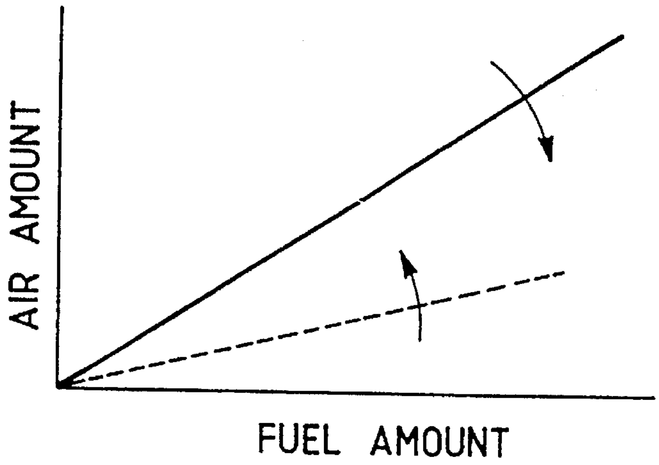
FIG. 3 is a control characteristic diagram.

As shown in FIG. 3, when the ratio of the total amount of air (the amount of all air supplied to the combustor) to the fuel amount becomes small, the temperature becomes high to induce thermal fatigue, so that a minimum amount of air to a set amount of fuel is limited. Further, when the amount of premixing air increases, the air fuel ratio increases and misfire occurs, so that the amount of premixing air is controlled to an optimum amount according to the amount of fuel.

Figure 4:
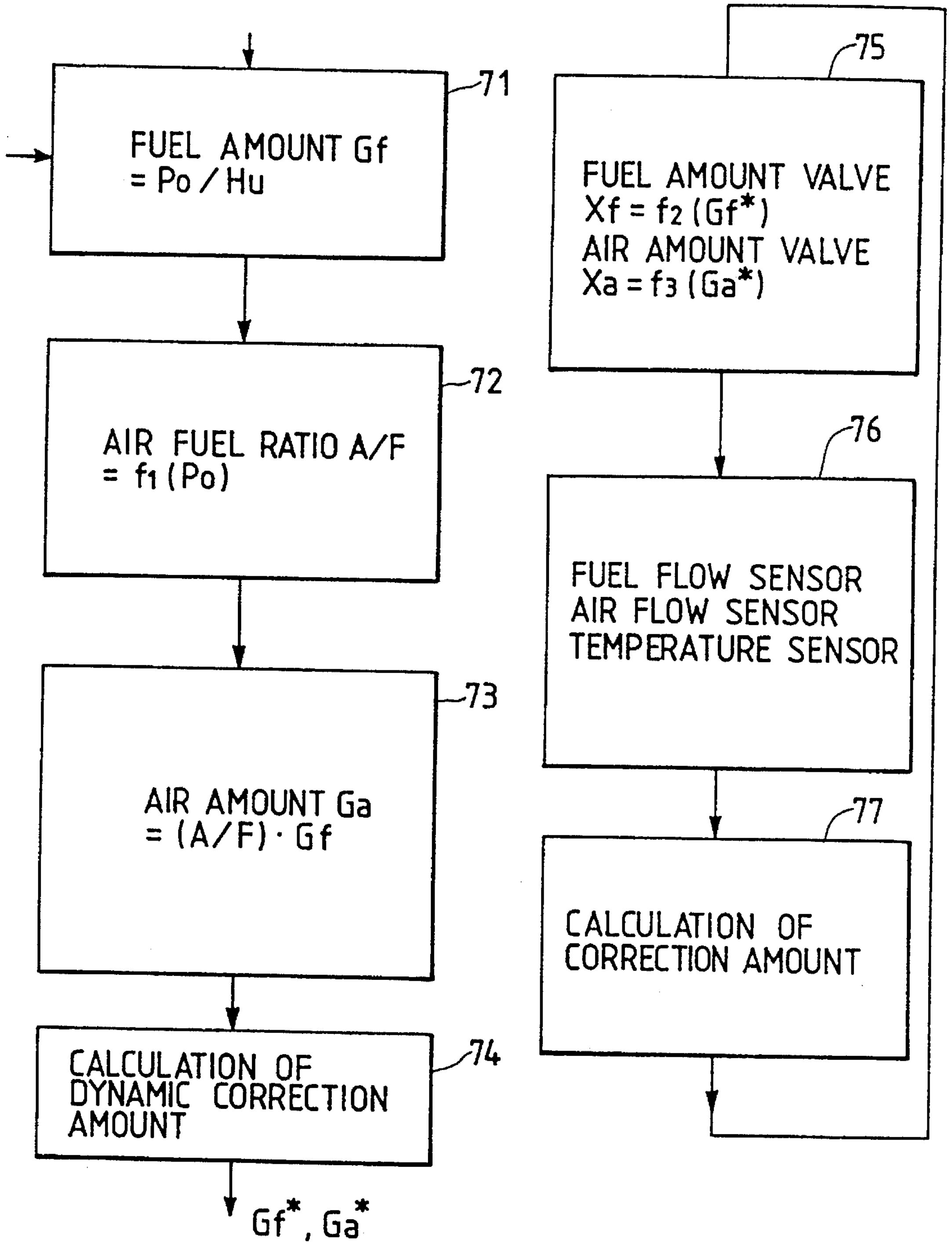
FIG. 4 is a flow diagram of a control operation.

FIG. 4 shows a flow chart of a control operation. For an output target value Po of the turbine, the total amount of fuel Gf (=Po/Hu) is given in view of a heat generation amount Hu in step 71. In the next step 72, a set air fuel ratio A/F (=f1(Po)) to the output target value Po is given. The set air fuel ratio is stored in advance in the memory of the control unit 60. In step 73, an amount of air Ga=(A/F)Gf is calculated. In step 74, a dynamic correction required by delay in the control system is effected, and an amount of air Ga* and an amount of fuel Gf* to be fed to the combustor 2 are set.

In step 75, an operational signal Xf (=f2(Gf*)) of the fuel flow regulating valves and an operational signal Xa (=f2 (Ga*)) of the premixing air flow valve are calculated on the basis of the obtained fuel amount Gf* and air amount Ga*, and the fuel flow regulating valve and premixing air valve are driven thereby. In step 76, measured value signals from the fuel flow sensor, air flow sensor and temperature sensor mounted on the gas turbine combustor are taken in, deviations from the target values Gf*, Ga* are calculated on the basis of the data, correction amounts ΔXf, ΔXa are calculated to cause the values to coincide with the set values Gf*, Ga*.

Figures 5A, 5B, 5C:
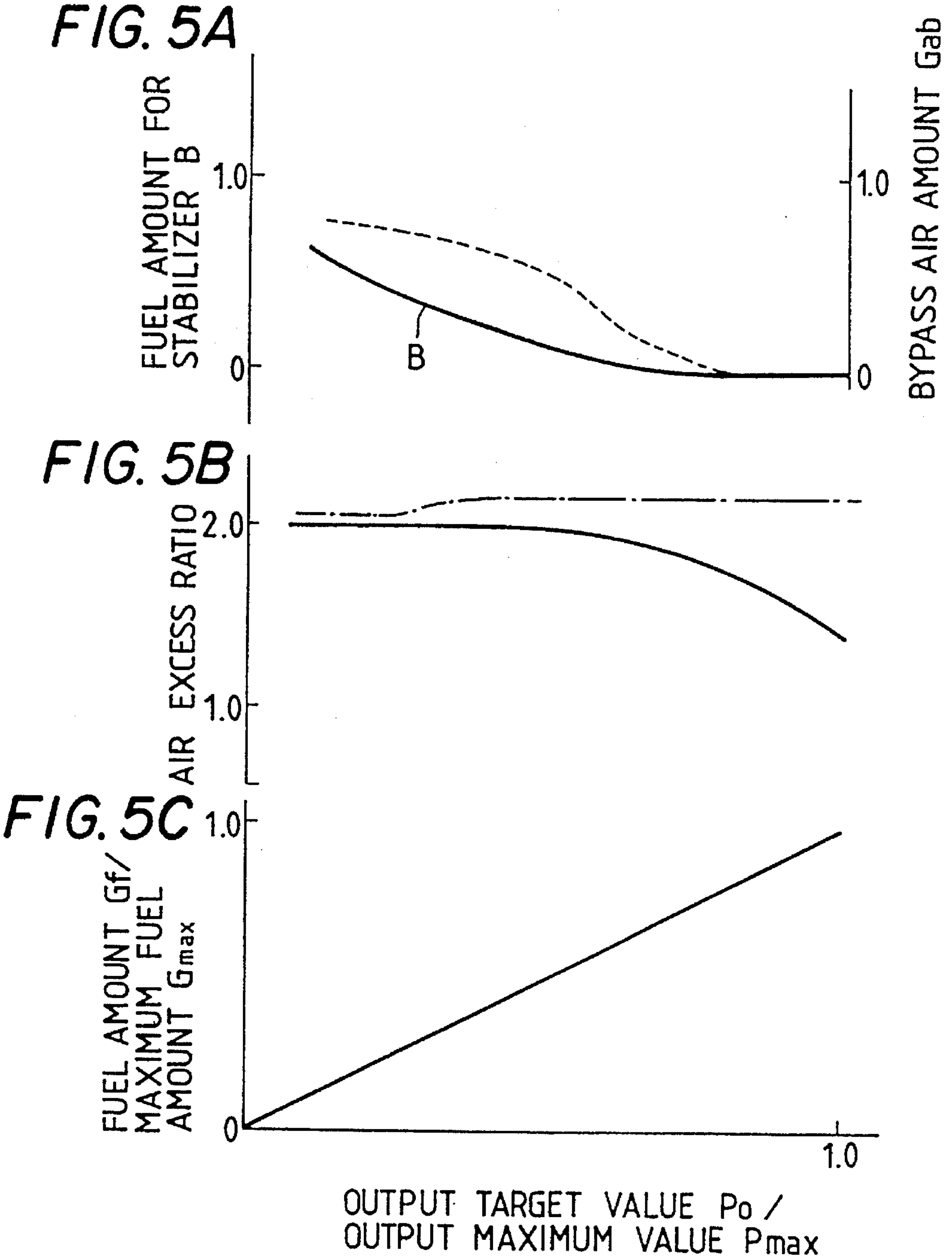
FIG. 5 is another characteristic diagram of control.

As shown in FIG. 5, when the heat generation amount and the thermal efficiency are constant, the fuel amount Df is proportional to the output target value. In the case where the amount of air in the premixing section 7 is constant, when the fuel amount Gf become small, the air excess ratio increases and reaches a dilution limit, and the combustion becomes unstable. In such a case, the bypass air flow valve 12 is opened to increase the amount of bypass air flow Gab, thereby to lower the air excess ratio in the premixing section 7. At this time, the amount of air in the premixing section 7 is detected using the air flow sensors 31, 35, 33, 34, so that the air fuel amount can be controlled so that the air fuel ratio reaches a level very close to the dilution limit, whereby the emission of nitrogen oxides can be minimized. Further, when the fuel amount decreases, flame stabilization becomes insufficient and misfire is apt to occur, so that the amount of flame stabilizing fuel B is increased. This fuel is supplied around the stabilizers 40, 41.

Figure 6:
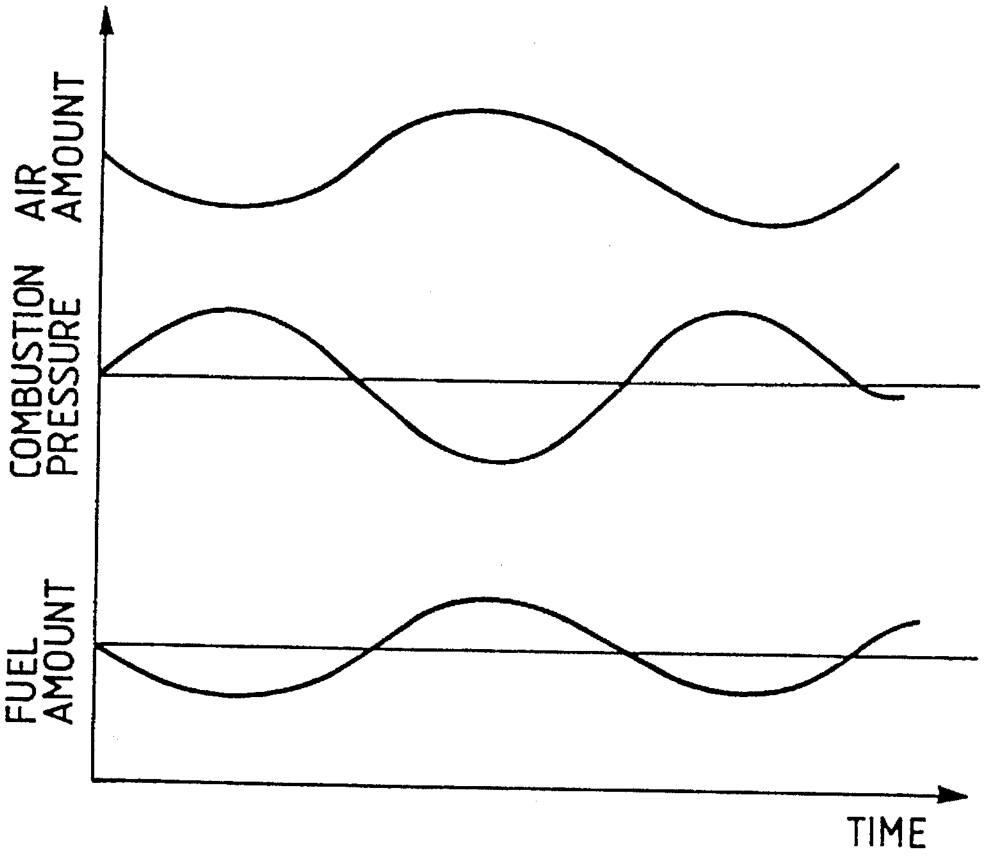
FIG. 6 is another characteristic diagram of control.
Figure 7:
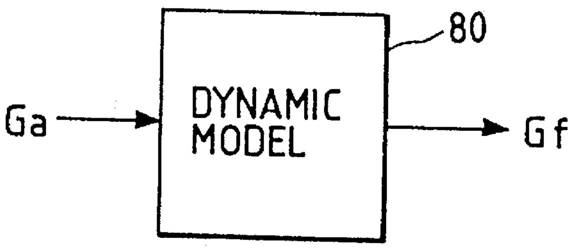
FIG. 7 is schematic diagram of a dynamic model.

As shown in FIG. 6, in this kind of combustor, it is known that as time lapses, an instability due to combustion occurs and a variation in combustion pressure takes place. Due to the construction of the combustor, the variation in combustion pressure becomes substantially equivalent to the variation in the amount of air flowing into each combustion section. Accordingly, in the case where the air flow sensors are arranged as in this embodiment, a variation in combustion pressure can be detected instantaneously. By controlling the amount of fuel so that the variation is suppressed on the basis of the detected signals of the air amounts, an active control becomes possible for the variation of the combustion pressure. As seen in FIG. 7, a detection signal of the detected air amount Ga is inputted into a dynamic model 80 to get an active fuel amount Gf.

Figure 8A:
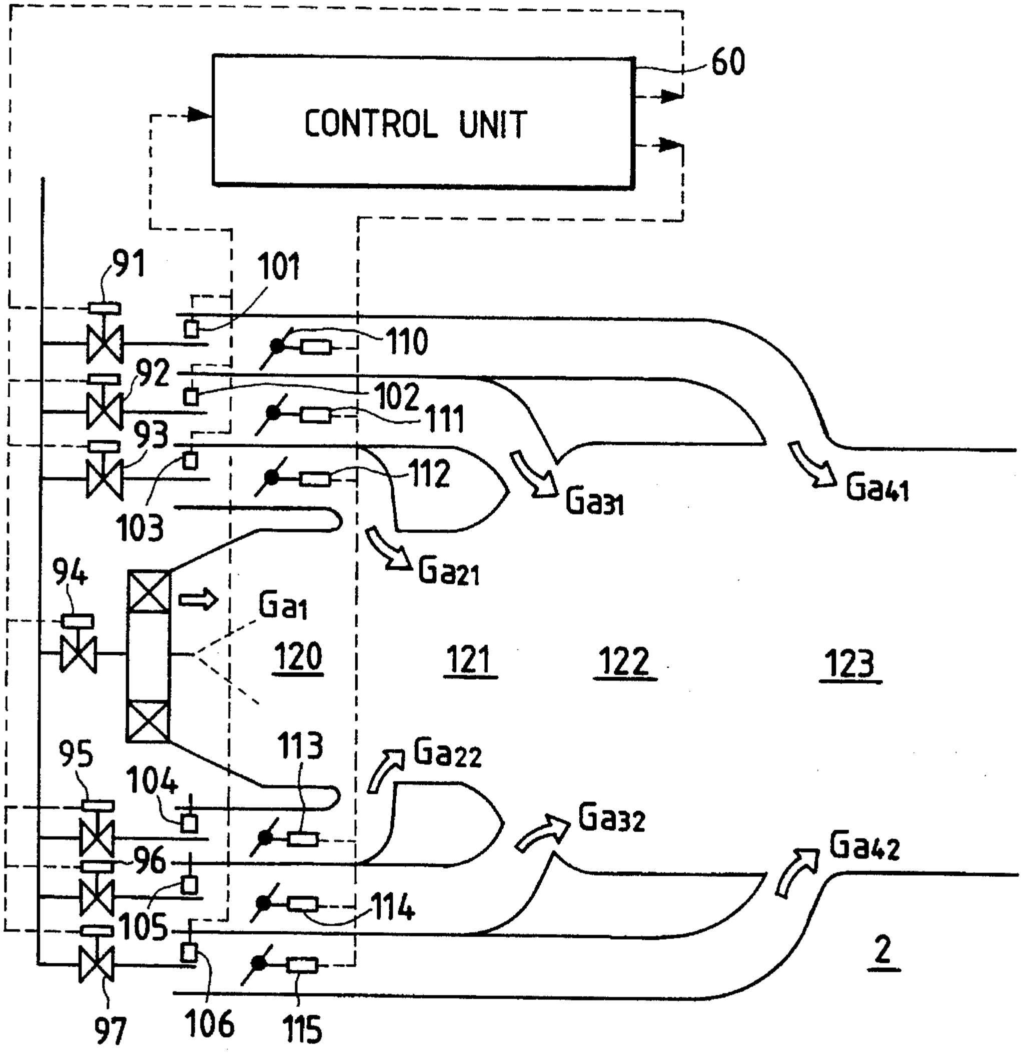
FIG. 8(*a*) is a schematic diagram of a gas turbine representing a second embodiment of the invention.
Figure 8B:
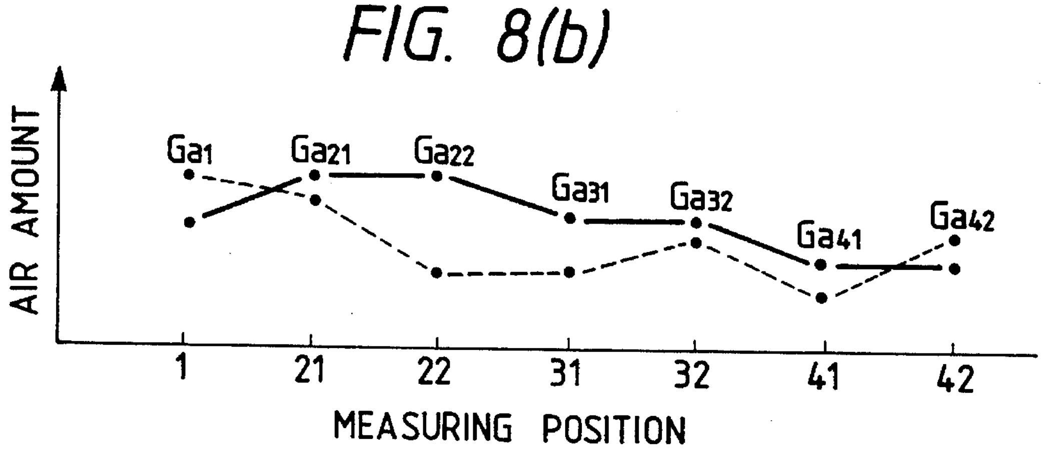

Another embodiment of the invention is described hereunder referring to FIG. 8(*a*).

In FIG. 8(*a*), showing a part of a gas turbine in which a control apparatus according to the invention is employed, a combustor 2 comprises a plurality of combustion sections, that is, a pilot section 120, a first premixing section 121, a second premixing section 122, and a third premixing section 123. Fuel which is controlled by a fuel flow regulating valve 94 is supplied to the pilot section 120. Both of the fuel controlled by fuel flow regulating valves 93, 95 and the air controlled by air flow valves 112, 113, each functioning as an air flow control valve, are supplied to the first premixing section 121. The air amount is measured by air flow sensors 103, 104 mounted adjacently at the upstream side of the air flow valve 112, 113.

The second premixing section 122 is supplied with fuel controlled by fuel flow regulating valves 92, 96 and air controlled by air flow valves 111, 114, each functioning as an air flow control valve, and the air amount is detected by air flow sensors 102, 105 mounted adjacently at the upstream side of the air flow valves 111, 114. The third premixing section is supplied with fuel controlled by fuel flow regulating valves 91, 97 and air controlled by air flow valves 110, 115, and the air amount is detected by air flow sensors 101, 106 mounted adjacently at the upstream side of the air flow valves 110, 115.

With this construction, air flow amounts Gal (in the pilot section 120), Ga21, Ga22 (in the first premixing section 121), Ga31, G32 (in the second premixing section 122), Ga41, Ga42 (in the third premixing section 123) in various local places of the combustor 2 are detected, and individually controlled. For example, as indicated by a solid line in FIG. 8(*b*), even in a case where optimum combustion is carried out when the air amounts at the various local places are distributed evenly over respective combustion sections at least, a conventional system is defective in that air amounts differ between the upstream side and downstream side of the air flow valve due to a difference between the valves themselves even in the same combustion section, as indicated by the broken line. However, in the present invention, the air amounts in the various local places are detected individually by the air flow sensors, and the operation amounts of the air flow valves can be corrected in the same manner as in the first embodiment in FIG. 1, so that the air amounts can be set very closely to the optimum distribution indicated by the solid line.

Figure 9:
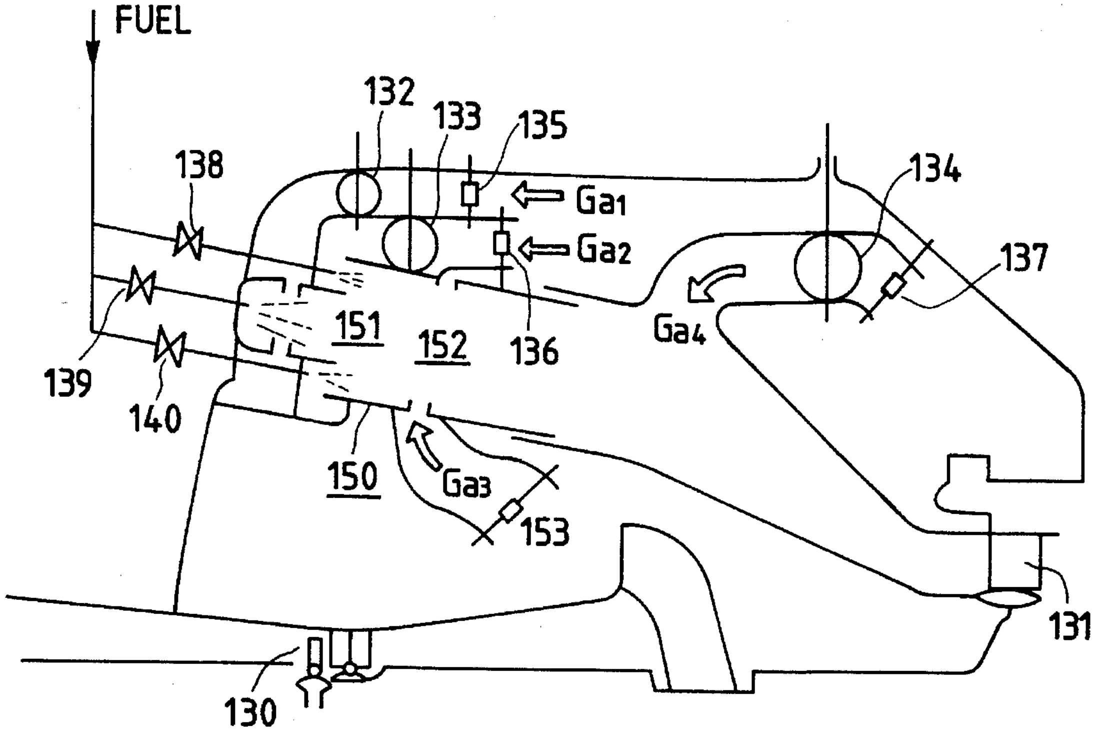
FIG. 9 is a schematic diagram of a gas turbine representing a third embodiment of the invention.

Further, another embodiment of the invention is described hereunder referring to FIG. 9.

In FIG. 9, showing a part of gas turbine in which a control apparatus according to the invention is employed, a plurality of combustors 150 are arranged around a compressor 130, and combustion gas is supplied to stationary blades 131. Each combustor 150 has a pilot section 151 and a premixing section 152. The pilot section 151 is supplied with air Gal through an air flow valve 132, functioning as an air flow control valve, and is supplied with fuel through a fuel flow regulating valve 139. The premixing section 152 is supplied with air Ga2 through an air flow valve 133 and fuel through fuel flow regulating valves 138, 140. Cooling air Ga3 is supplied on the downstream side of the premixing section 152; further, bypass air Ga4 is supplied on a further downstream side thereof through a bypass air flow valve 134. The an air flow valves and air bypass valve all are arranged in air passage from the compressor 130 to the combustion sections 151, 152 of the combustor 150 to control the flow rates of the combustion air.

Amounts of air (air amount in local a place) passing through respective valves are detected by air flow sensors 135 (Ga1), 136 (Ga2), 137 (Ga4), 153 (Ga3) disposed closely to respective valves. The total amount of air Ga=Ga1+Ga2+Ga3+Ga4 is calculated for each combustor and is compared. Further, air amounts Ga1, Ga2, Ga3, Ga4 in the local places for each combustor are compared between the combustors, and the air valves 132, 133, 134 are operated so that any difference between the combustors will not occur, whereby the operations of the combustors become the same, and thermal energy is supplied evenly to each turbine stationary blade 131.

Figure 10:
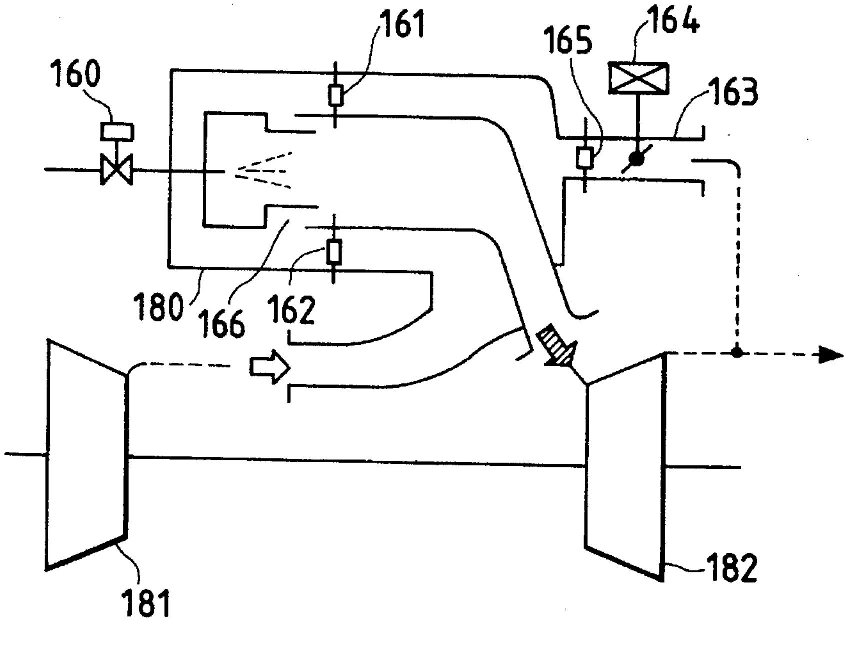
FIG. 10 is a schematic diagram representing a gas turbine of a fourth embodiment of the invention.

Further, another embodiment of the invention is described referring to FIG. 10, which shows a gas turbine employing a control apparatus according to the invention.

Figure 11:
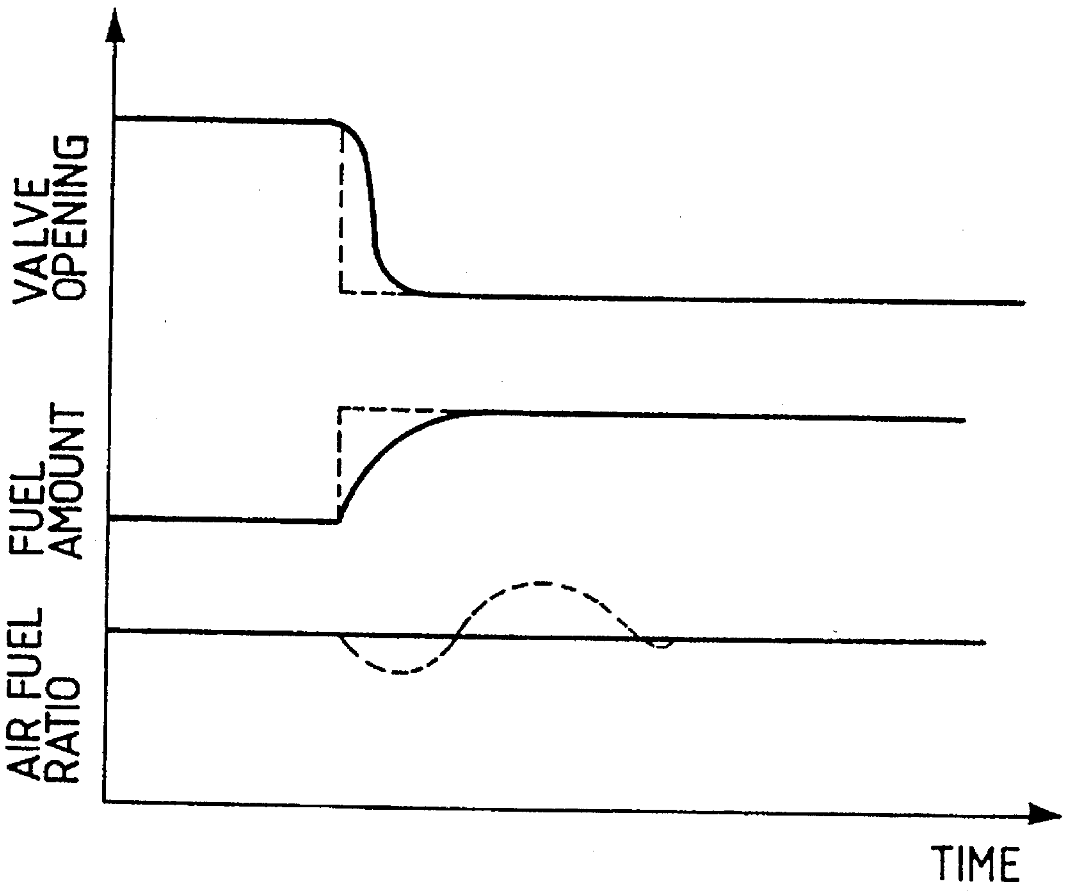
FIG. 11 is a control characteristic diagram of the fourth embodiment.

In FIG. 10, air from a compressor 181 enters a combustor 180; however, a part of the air is exhausted to an outlet of the turbine 182 through an air exaction passage 163. The passage 163 is provided with an air flow valve 164 and an air flow sensor 165 adjacent to and at the upstream side of the air flow valve 164. Further, the amount of combustion air is detected by air flow sensors 161, 162 arranged in the vicinity of an intake port 166 for taking air into a main combustion chamber, and the fuel amount is controlled by a fuel flow regulating valve 160. In this construction, as shown in FIG. 11, when the air flow valve 164 is closed, the amount of air to the combustor 180 increases, and it is possible to increase the amount of fuel. However, in a conventional construction, as indicated by the broken line, the transitional air fuel ratio changes resulting in the defect that misfire and an increase in the emission of nitrogen oxides may be caused. On the contrary, in accordance with the invention, the amount of combustion air is directly measured by the air flow sensors 161, 162 and the fuel flow regulating valve 160 is controlled, based on the result, so that variations of the air fuel ratio can be reduced to zero, as shown by the solid line in FIG. 11.

Next, an air flow sensor which can be suitably used for this invention will be explained.

As air flow sensors there are a Karman vortex flowmeter, a Pitot tube, an ultrasonic flowmeter, a laser Doppler velocimeter, a movable plate flowmeter, an orifice meter, a laminar flowmeter, a hot wire sensor, etc.; however, the hot wire sensor is most suitable in that the mass velocity can be directly detected without correction for the density of the air.

Figure 12:
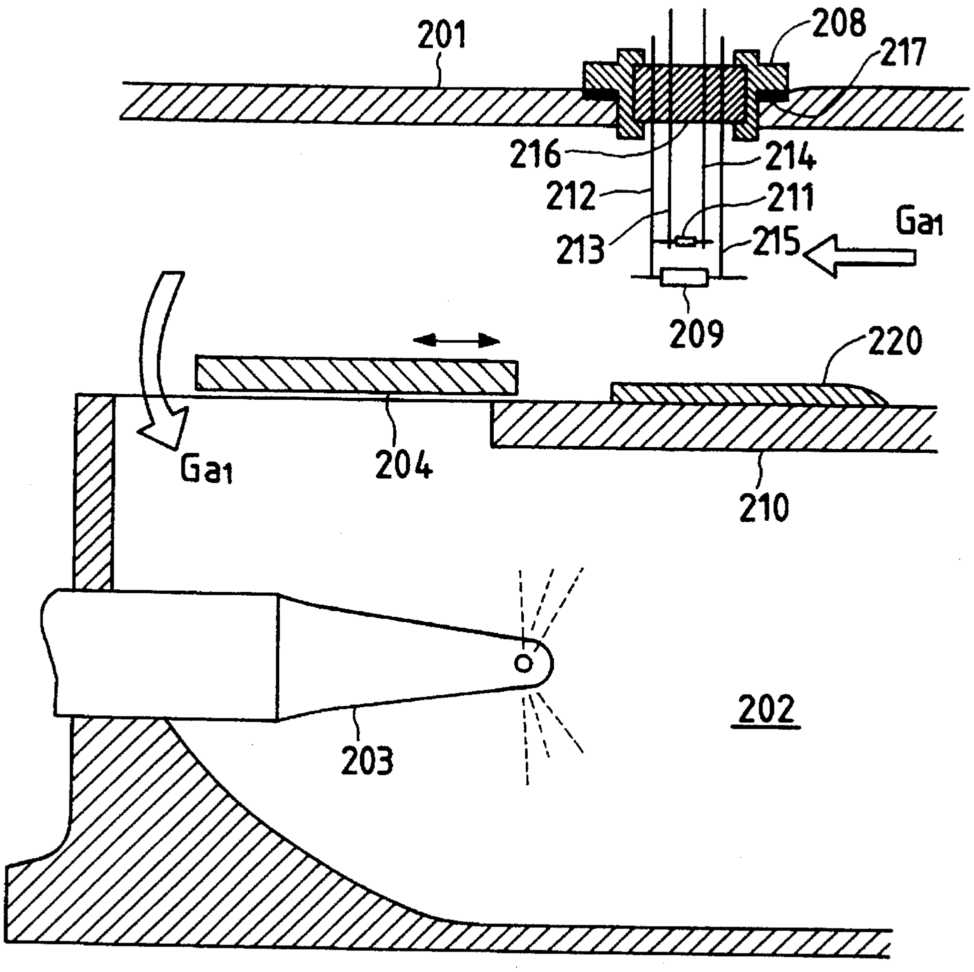
FIG. 12 is a sectional view a part of a combustor showing an arrangement of a sensor.

An example of the sensor and a mounting method for the sensor will be explained for the case in which sensor is arranged at the upstream side of the air flow valve 10 and in the vicinity of the valve 10 in the combustor shown in FIG. 1. As shown in FIG. 12, a sensor S is fixed to an outer cylinder 201 of the combustor through a plug 208 made of stainless steel. The amount of air Ga1 distributed to a premixing section 202 is controlled by an opening of a slide valve 204 ( corresponding to the air flow valve 10). Fuel is supplied by a nozzle 203.

A hot wire probe 209 described later (refer to FIG. 13) and a temperature probe 211 are arranged in an annular gap ( about 40 mm) between the outer cylinder 201 and an inner cylinder 210, and supported by supports 212, 215 and supports 213, 214 each of which is made of stainless steel, respectively. The supports serve as lead wires and they are connected to form a bridge circuit as shown in FIG. 14. The supports 212, 215, 213, 214 each are fixed by a ceramic member 216, and the ceramic member 216 is calked assembled by the plug 208. A washer 217 is disposed between the outer cylinder 201 and the plug 208 to prevent leakage of gas to the outside.

The hot wire probe 209 is mounted about a radially central portion of a passage defined between a bell-mouth-shaped rectifying member 220 and the outer cylinder 201. An amount of air Gal is calculated by multiplying the detected air value by a value of the sectional area of the passage. A correct flow amount can be detected by providing the rectifying member 220 to eliminate any influence of the deflection in flow by the slide valve 204.

Figure 13:
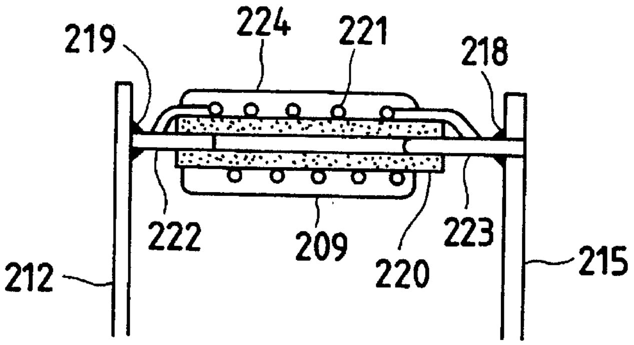
FIG. 13 is a view showing a sensor construction.
Figure 14:
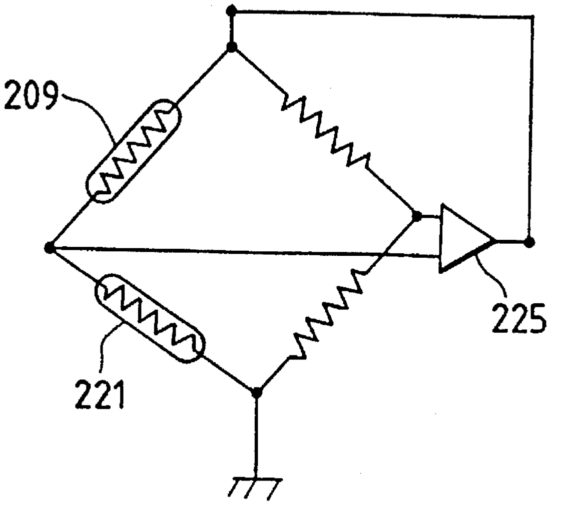
FIG. 14 is a diagram of a sensor circuit.

As shown in FIG. 13, the hot wire probe 209 is spot-welded to the supports 212, 215 of stainless steel. The hot wire probe 209 is made by winding a Pt wire of 20 μm diameter on a ceramic pipe 220 of 0.2 to 0.5 mm diameter and 1 to 3 mm length. The ceramic pipe 220 is supported on the supports 212, 215 through lead wires 222, 223. Ends of the Pt wire 221 are spot-welded to the lead wires 222, 223. The Pt wire is covered with a film of heat resistant glass 224 and fixed to the ceramic pipe 220. The lead wires 222, 223 each are composed of a Pt—Ir alloy, softer than the supports 212, 215, and absorb mechanical stress and thermal stress. By this construction, it can be operated up to a temperature of 700° C.

An example of a bridge circuit incorporating the hot wire probe 209 and the temperature probe 211 is shown in FIG. 14. Current is applied in the bridge circuit by an amplifier 225, the temperature of the hot wire probe 209 is set to a temperature higher than the temperature probe 211 by about 100° C., and the flow velocity is detected by the electric current flowing at that time. For example, when the temperature of a gas, such as combustion air to be supplied to the combustor, is 370° C., the temperature of the hot wire probe 209 is about 470° C. At this time, since a part of the heat escapes through the supports 212, 215, each of the supports 212, 215, 212, 214 is supported by the ceramic member 216( FIG. 12) which is low in thermal conduction, as mentioned above, in order to avoid errors in measurement. By this construction, the heat that escapes outside through the supports can be reduced to 1% or less as compared with the case of a metal support in which it is about 5%, so that precision in measurement can be improved.

Next, as mentioned above, the above-mentioned air fuel ratio control according to the invention takes in other measurement signals concerning local combustion states in the combustor, and necessary correction is effected on the basis of the measured signals, whereby further stable combustion conditions can be continued. Some examples are explained hereunder.

Figure 15:
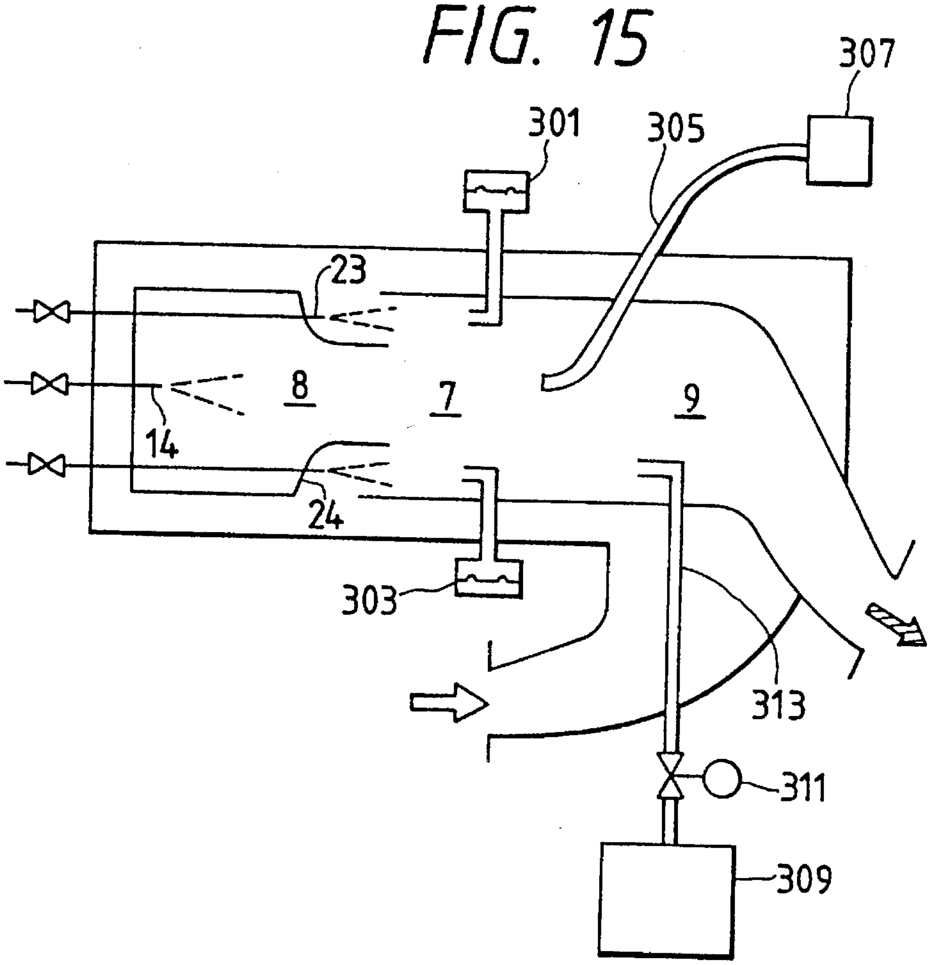
FIG. 15 is a schematic diagram of a combustor showing an aspect of detection of combustion conditions.

FIG. 15 shows another embodiment to detect combustion conditions. Detection methods of combustion conditions which are explained hereunder can be used for all types of gas turbines, such as shown in FIGS. 1, 8(*a*), 9, 10. Therefore, only parts which are necessary to detect the combustion conditions are illustrated in FIG. 15, and air flow distribution valves, air flow sensors, a compressor, etc. are omitted.

In FIG. 15, a combustor comprises a diffusion section 8, a premixing section 7 and a downstream section 9. Fuel is supplied into a combustion section by a fuel nozzle 14, and nozzles 23, 24. Pressure sensors 301, 303 are mounted on the premixing section 7. As the combustion in the premixing section 7 becomes unstable, the pressure changes. The variation in the pressure is detected by the pressure sensors 301, 303, and is sent to the control unit 60. The control unit 60 calculates correction signals concerning opening of the fuel flow valve and/or air flow valve on the basis of signals of the detected variation. Fuel amount and air amount are corrected by the correction signals and the air fuel ratio is controlled, whereby the combustion is stabilized. As the pressure sensors 301, 303, a sensor of the type in which strains in a diaphragm are converted into electric signals is used, for instance.

As the other means for detecting combustion conditions, an optical fiber 305 and a photoelectric convertor 307 may be used. The optical fiber 305 conducts a flame spectrum in the premixing section 7 into the photoelectric convertor 307, the combustion conditions are detected from the spectrum. For example, when the intensity of the spectrum becomes higher this means that the combustion temperature becomes higher. Further, that when the intensity of the spectrum becomes low, this means that a misfire is likely to occur. Therefore, by also using signals based on the intensity of the spectrum, correction signals for correction of an amount of fuel and an amount of air can be calculated in order to detect possible misfire and avoid the misfire.

Further, correction signals indicating the concentration of nitrogen oxides in the premixing section 7 can be obtained by using a nitrogen oxide concentration sensor 309, a flow control valve 311 and a sample pipe 313, and the amount of air can be controlled to make the air fuel ratio in the premixing section 7 larger and to lower the combustion temperature when the detected nitrogen oxide concentration is higher that a set value, for instance. Further, as the nitrogen oxide concentration sensor 309, a known chemiluminescent detector can be effectively used.

One kind of sensor or a combination of various kinds of sensors can be used. For example, by obtaining independently a correction signal for correcting the fuel amount supplied from the fuel nozzle 23 on the basis of signals from the pressure sensor 301, a correction signal for correcting the amount of fuel supplied from the fuel nozzle 24 can be obtained on the basis of signals from the pressure sensor 303, whereby uneven distribution of air fuel ratios in local places can be detected more surely and more promptly, and an increase in the emission of nitrogen oxides due to the uneven distribution of the air fuel ratios can be suppressed more surely (this case can be suited particularly effectively for the gas turbine of the type shown in FIG. 8(*a*)).

As mentioned above, according to the invention, in a gas turbine having an air flow control valve for controlling the flow rate of combustion air in an air flow passage from a compressor to the gas turbine, the amount of air supplied into a combustion section is measured on the basis of signals from an air velocity or flow sensor (for example, a hot wire sensor) arranged in the vicinity of the air flow control valve. Therefore, the amount of combustion air for a combustor can be directly and highly precisely detected, and an air fuel ratio in the combustion section can be controlled by controlling the opening of a fuel flow regulation valve and/or air fuel flow control valve on the basis of the measured value, so that the air fuel ratio can be set to a large value about a limit value, and the emission of nitrogen oxides can be reduced without causing misfire, after burning.

In a preferable aspect of the invention, it is possible to reduce any difference in air amount and air fuel ratio between local places in each combustor to zero by precisely measuring the amount of combustion air by the air flow sensors, as mentioned above, arranged in a plurality of places in the combustor. By this construction also, the air fuel ratio can be set to a large value and the emission of nitrogen oxides can be reduced to a low level.

Further, in a preferable aspect, since the air flow velocity or the air flow rate in each combustor can be precisely measured, it is possible to control air fuel ratios in respective combustors to be uniform, whereby the emission of nitrogen oxides can be lowered.

Namely, since a problem of imbalance in air fuel ratio between local places is easily solved, the emission of nitrogen oxides can be reduced by the control apparatus and method according to the present invention by about 30% as compared with the prior art in which air fuel ratio is lowered in some local places thereby to cause an increase in the emission of nitrogen oxides.

Further, by applying the control apparatus and method according to the present invention to a gas turbine effecting multi-stage combustion, it is possible to control the air fuel ratio to an optimum value in a diffusion section and a premixing section according to the load. It is possible in this way to prevent the air fuel ratio from becoming too large and thereby causing misfire; and after burning occurs, a stable power can be generated made available.

Further, even in the case where the outside temperature and heat generation changes during the operation, a suitable air amount and an air fuel ratio can be set easily and promptly according to the change, so that stable combustion is effected in a practical machine to output sufficient power even if cold operation from 40° C. and a warming operation were to occur.

Further, since the fuel amount is controlled by directly detecting the air amount at the inlet of the combustion chamber and using the detected signal, the response time is reduced from 1 second to 100 ms or less in the practical machine, and the emission of nitrogen oxides caused by the change in air fuel ratio at the transitional time is reduced by 50%.

Further, since there is no difference in air fuel ratio between respective combustors, the average emission amount of nitrogen oxides is reduced by about 20% in the practical machine.

Further, since the fuel amount is corrected by detecting a change in the amount of air right before entering the combustor, the occurrence of combustion vibrations is prevented.

Further, since the fuel amount is corrected promptly according to a change in the air amount, a change in the air fuel ratio at the air distribution switching time is suppressed to 0.3 or less in change width of air fuel ratio in the practical machine, and an emission amount of nitrogen oxides at a transitional time is reduced by 30%.

Further, since the combination of the combustion temperature control and the air fuel ratio control is made highly precise, thermal fatigue of the turbine is prevented greatly.

What is claimed is:

1. A control apparatus for a gas turbine having an air flow control valve for controlling a flow rate of combustion air in an air flow passage from a compressor to the gas turbine, comprising: at least an air velocity or flow sensor arranged upstream of said air flow control valve in the vicinity of said air flow control valve, and control means for controlling an opening of a fuel flow regulation valve and/or said air flow control valve on the basis of a signal from said air velocity or flow sensor, thereby to control an air fuel ratio in a combustion section of the gas turbine.

2. A control apparatus according to claim 1, wherein an air flow control valve and an air velocity or flow sensor are arranged in each of a plurality of local places in a combustor in the combustion section of the gas turbine, thereby to control an air fuel ratio in each of the local places of the combustion section.

3. A control apparatus for a gas turbine having a plurality of combustors arranged around a compressor and a respective air flow control valve for controlling a flow rate of combustion air in an air flow passage from the compressor to a combustion section of each of the combustors, comprising: a respective air velocity or flow sensor arranged upstream of the air flow control valve in the vicinity of the air flow control valve disposed in each of the combustors, and control means for controlling an opening of a fuel flow regulation valve and/or an air flow control valve on the basis of signals from said air velocity or flow sensors, thereby to control individually an air fuel ratio in each of said combustors.

4. A control apparatus according to claim 3, wherein air flow control valves and air velocity or flow sensors are arranged in each of a plurality of local places in each of said combustors, thereby to control an air fuel ratio in each of the local places of each of said combustors.

5. A control apparatus according to claim 1, wherein said control means controls fuel and/or air in a closed loop manner, thereby to control an air fuel-ratio.

6. A control apparatus according to claim 5, wherein on the basis of a measured value of one of air and fuel, an amount of the other valve is controlled.

7. A control apparatus according to claim 1, wherein said control apparatus further comprises a combustion condition sensor for detecting combustion conditions of said combustion section, and correction amount calculation means for correcting an air fuel ratio in said combustion section.

8. A control apparatus according to claim 7, wherein said combustion condition sensor is one of a pressure detection sensor in said combustion section, a temperature detection sensor, a fuel concentration detection sensor and a flame spectrum detection sensor.

9. A control apparatus according to claim 1, wherein said air velocity or flow sensor arranged in the vicinity of said air flow control valve is an air flow sensor of the type in which a Pt wire supported by a ceramic support is heated to a temperature equal to or higher than air temperature of the combustion air, and further wherein said Pt wire is covered with a film of heat resistant glass.

10. A method of controlling a gas turbine having an air flow control valve for controlling a flow rate of combustion air in an air flow passage from a compressor to the gas turbine, comprising the steps of:

obtaining a measured value of a velocity or flow rate of combustion air in the vicinity of said air flow control valve using at least an air flow sensor arranged upstream of the air flow control valve; and regulating an opening of a fuel flow regulation valve and/or air flow control valve on the basis of said measured value, thereby to control an air fuel in a combustion section of said gas turbine.

11. A control apparatus according to claim 9, wherein said ceramic support is fixed through a lead wire which is softer than said ceramic support.

12. A control apparatus for a gas turbine having at least a combustor arranged for said gas turbine, said combustor having a combustion section, a downstream section positioned downstream of said combustion section, at least an air flow control valve for controlling a flow rate of combustion air introduced from a compressor into said combustion section, a bypass bypassing said combustion section for introducing air from the compressor into said downstream section and a bypass air flow control valve for controlling a flow rate of air flowing in said bypass, said combustion section including a premixing section in which premixing nozzles are arranged and a diffusion section in which diffusion nozzles are arranged, said control apparatus comprising:

an air flow sensor arranged upstream of said air flow control valve for sensing a flow rate of combustion air;

a bypass air flow sensor arranged upstream of said respective bypass air flow control valve for sensing a flow rate of air in said bypass; and a control unit for controlling said air flow control valve and said bypass air flow control valve on the basis of signals from said air flow sensor and said bypass air flow sensor, thereby to control an air flow ratio in a combustion section.

13. A control apparatus according to claim 12, wherein said air flow sensor senses a flow rate of combustion air to be introduced into said premixing section and said diffusion section, wherein a further air flow sensor is provided for sensing a flow rate of combustion air to be introduced into said diffusion section, and wherein said control unit calculates a flow rate of combustion air to be introduced into said diffusion section on the basis of signals from said air flow sensor and said further air flow sensor.

* * * * *